No. 823,287. PATENTED JUNE 12, 1906.
M. MEYER.
APPARATUS FOR DELIVERING ACID AND ALKALINE LIQUIDS IN MEASURED QUANTITIES.
APPLICATION FILED DEC. 4, 1905.
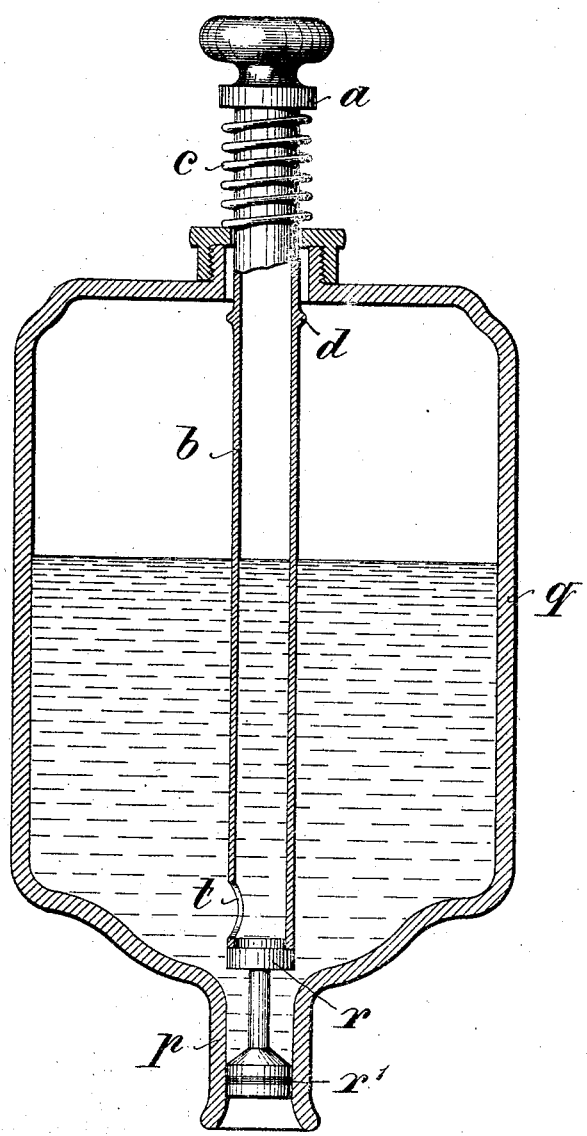
Witnesses:
W. H. Pumphrey.
M. G. Crawford
Inventor:
Max Meyer
by H. Van Renssalaer
Attorney

UNITED STATES PATENT OFFICE.

MAX MEYER, OF BERLIN, GERMANY.

APPARATUS FOR DELIVERING ACID AND ALKALINE LIQUIDS IN MEASURED QUANTITIES.

No. 823,287.        Specification of Letters Patent.        Patented June 12, 1906.

Application filed December 4, 1905. Serial No. 290,301.

*To all whom it may concern:*

Be it known that I, MAX MEYER, a subject of the King of Prussia, German Emperor, and a resident of Berlin, Germany, (whose post-office address is No. 22 In den Zelten, Berlin, Prussia, German Empire,) have invented a new and useful Apparatus for Delivering Acid and Alkaline Liquids in Measured Quantities, of which the following is a specification.

The present invention relates to improvements in an apparatus for delivering liquids in measured quantities, and the subject of the invention is to so construct the apparatus as to make it adapted for delivering acid or alkaline liquids. It is essential to that effect that all the parts which come into contact with the liquid are constructed of material that resists the action of acids and alkalies and that the whole apparatus be as simple as possible.

The liquid to be delivered is contained in a vessel of glass or other resisting material, provided with a tubular extension in which the double piston of glass, vulcanite, india-rubber, or the like material is displaced in such a manner that the space between the two pistons communicates either with the vessel or with the atmosphere. The piston-rod, which passes through the top of the vessel, is preferably hollow, with a detachable handle at the upper end and a slot at the bottom above the top piston, so that the vessel can be charged with liquid through the hollow piston-rod. This piston-rod is held in its normal position—that is, in the position wherein the discharge-opening of the vessel is kept closed by the lower piston—by a spring placed outside the vessel between the top of the same and the detachable handle of the piston-rod.

The invention is illustrated on the annexed drawing, which shows the apparatus in section.

The vessel $q$, containing the liquid is provided with a tubular extension $p$, in which the double piston $r\ r'$ is displaced in such a manner that the space between the two pistons communicates either with the vessel or with the atmosphere. The piston $r\ r'$ is actuated by a hollow piston-rod which passes through a gland on the top of the vessel. The outer end of the piston-rod is closed by a suitable knob adapted to be removed to permit of filling the vessel through said rod, as hereinafter described. The travel of the double piston $r\ r'$ is so that in its normal position the piston $r'$ is in the tubular extension $p$ and the piston $r$ in the body of the vessel clear of the extension. When in this position, the liquid in the vessel will flow in between the two pistons, partially filling the tubular extension. If the piston be now moved downward, it will take down with it a volume of liquid equal to the volume of space between the two pistons. At the end of the downward stroke the top piston $r$ will be in and the bottom piston $r'$ clear of the tubular extension $p$, therefore permitting the liquid between the two pistons being discharged.

The piston descends by a pressure being applied to the hollow piston-rod $b$, which overcomes the compression of the spring $c$, the tendency of which is to keep the piston in its normal position, which is determined by a stop $d$ on the piston-rod $b$. The spring $c$ is placed between the top of the vessel and the handle $a$, secured on the upper end of the piston-rod. The vessel is charged through the hollow piston-rod, which, to that purpose, is provided with a slot $t$ above the piston $r$, which allows the liquid to pass through the rod into the vessel. The vessel itself, together with the tubular extension, is constructed of glass or other material which resists the action of acids and alkalies, and the double piston and the piston-rod are also constructed of resisting material, such as glass, vulcanite, india-rubber, and the like. The tubular extension is slightly flared out both at the upper and lower end to facilitate the insertion of the double piston, and the lower piston $r'$ is somewhat chamfered for the better discharge of the whole of the liquid between the two pistons.

What I claim, and desire to secure by Letters Patent of the United States, is—

1. In an apparatus for delivering liquid in measured quantities, the combination of a closed vessel having a tubular extension at one extremity thereof, a double piston adapted to move in and partially out of said tubular extension, and a piston-rod passing through the other extremity of the vessel, said piston-rod being hollow and provided with an opening communicating with the interior of the vessel and an opening exterior of the vessel whereby the vessel can be filled with liquid through said rod.

2. In an apparatus for delivering liquid in measured quantities, the combination of a closed vessel having a tubular extension at one extremity thereof, a double piston adapted to move in and partially out of said tubular extension, and a piston-rod passing through the other extremity of the vessel, said piston-rod being hollow and provided with an opening communicating with the interior of the vessel and an opening exterior of the vessel, together with means for closing said exterior opening.

3. In an apparatus for delivering liquid in measured quantities, the combination of a closed vessel having a tubular extension at one extremity thereof, a double piston adapted to move in and partially out of said tubular extension, and a piston-rod passing through the other extremity of the vessel, said piston-rod being hollow and provided with an opening communicating with the interior of the vessel and an opening exterior of the vessel, together with means for closing said exterior opening, said means comprising a knob adapted to serve as a handle for the piston-rod.

4. In an apparatus for delivering liquid in measured quantities, the combination of a closed vessel having a tubular extension at one extremity thereof, a double piston adapted to move in and partially out of said tubular extension, and a piston-rod passing through the other extremity of the vessel, said piston-rod being hollow and provided with an opening communicating with the interior of the vessel and an opening exterior of the vessel through which liquid can be supplied to the vessel, together with a spring normally tending to draw the double piston toward the interior of the vessel.

5. In an apparatus for delivering liquid in measured quantities, the combination of a closed vessel having a tubular extension at one extremity thereof, a double piston adapted to move in and partially out of said tubular extension, and a piston-rod passing through the other extremity of the vessel, said piston-rod being hollow and provided with an opening communicating with the interior of the vessel and an opening exterior of the vessel, a knob adapted to close the outer end of the piston-rod, and a spring normally tending to draw the double piston toward the interior of the vessel, said spring being located between the knob on the end of the piston and one extremity of the vessel.

In testimony whereof I have hereunto set my hand in presence of two subscribing witnesses.

MAX MEYER.

Witnesses:
  HENRY HASPER,
  WOLDEMAR HAUPT.